Patented Mar. 15, 1938

2,110,943

UNITED STATES PATENT OFFICE 2,110,943

FUNGICIDE

John Paul Remensnyder, Metuchen, N. J.

No Drawing. Application June 5, 1935, Serial No. 25,126

3 Claims. (Cl. 167—22)

This invention relates to fungicides, as used, for instance, for the disinfection of soil. It also concerns a method and means, carrier or binder, for rendering fungicides more effective.

Probably the most important single factor which prevents the normal germination of seeds and the consequent emergence of a healthy seedling is the activity in the seed bed of various fungi. This has resulted in the introduction and use of various methods to reduce the activity of the fungi. The most effective methods, perhaps, are the complete sterilization of the seed bed with steam or by drenching thoroughly with a solution of formaldehyde.

Steam sterilization, while effective in controlling fungi, is prohibitively costly and has an adverse effect on the physical characteristics of the soil. The formaldehyde soak method also has an undesirable physical effect on the soil and is likely to result in seed injury and stunting of the seedlings.

This invention is primarily directed to a formaldehyde fungicide. More recently formaldehyde has been used in the form of dust preparations. They comprise a so-called inert material such as infusorial earth, clay, charcoal, etc., with which is admixed a certain amount of formaldehyde solution. Such formaldehyde dusts are in some cases fairly effective. However, they are by no means ideal, as the effective formaldehyde content is liable to diminish or to vanish entirely under ordinary conditions of storage.

In addition, the so-called inert materials are distinctly active; for instance, charcoal results in shifting the pH of the treated soil sharply to the alkaline side, so much so, that the agriculturist is warned against the use of the charcoal formaldehyde dust in soils which have been already limed. Other so-called inert carriers adversely affect the seedling, resulting in small stunted and yellow stands. Again, repeated applications of these dusts have an undesirable cumulative effect by modifying the physical characteristics of the seed bed soil. Since comparatively large quantities of inert material are required to carry an effective amount of formaldehyde, repeated applications become objectionable for the reason alone, that the fertile soil is unduly "diluted" by the inert bulk.

Generally speaking, I have overcome these disadvantages of the prior art by substituting a useful and beneficial material for the inert carrier, said material accommodating the formaldehyde in much greater concentration.

I have discovered a fungicide which is ideally adapted for use in agriculture, especially for the disinfection of soil such as seed beds. This new composition comprises a product obtained by the mixture and/or interaction between formaldehyde and urea. These products may be applied in either liquid or solid form. They are distinctly unstable and continuously liberate formaldehyde, the rate of liberation depending on the exact character of the urea formaldehyde composition, temperature, moisture, acidity and other factors. As the formaldehyde is liberated and performs its function as a fungicide, the nitrogenous residue becomes available as plant food.

Therefore, my new composition provides a method for effectively controlling fungi; at the same time it stimulates normal plant growth. No inert material is present and therefore the undesirable secondary effects of inerts are avoided.

It has been found that application of as low as one-quarter ounce of my composition per square foot gave good control of seed decay and the condition known as damping off. However, I am not bound to dose the composition of my invention within a small margin; it has been found usable in proportions up to three ounces per square foot.

Germination counts of various seed types grown in treated soil, as compared to seeds grown in untreated soil, demonstrate strikingly the value of the new compositions. However, it is not sufficient to merely bring the seedling through the surface of the earth, but to also control post-emergence damping off. Here too, experiments have demonstrated the value of the new compounds in maintaining a good stand of vigorous seedling through the dangerous period following emergence. This is elucidated by the following results with various vegetables, the soil having in each instance been treated to a depth of three inches with one of my fungicides, e. g. according to Example 3 described below, and the count of healthy plants being taken at the end of one month:

| Oz. of fungicide per sq. ft. | Total germination and healthy plants per 100 seeds | | | | | | | | | |
|---|---|---|---|---|---|---|---|---|---|---|
| | Beet | | Radish | | Spinach | | Cucumber | | Pea | |
| | Germination | Healthy plants | Germination | Healthy plants | Germination | Healthy plants | Germination | Healthy plants | Germination | Healthy plants |
| Check | 44 | 46 | 74 | 70 | 4 | 2 | 28 | 8 | 7 | 0 |
| ¼ | 84 | 68 | 94 | 84 | 58 | 34 | 78 | 72 | 66 | 53 |
| ½ | 78 | 88 | 96 | 86 | 64 | 60 | 88 | 80 | 92 | 86 |
| 1 | 94 | 92 | 92 | 82 | 70 | 62 | 100 | 96 | 100 | 100 |
| 1½ | 84 | 76 | 82 | 66 | 60 | 52 | 100 | 84 | 100 | 79 |

Of course my novel fungicides or fertilizer fungicides may be applied or admixed with other fertilizers or other fungicides without departure from the spirit of the invention. The fungicides or fertilizer-fungicides of my invention may be prepared in many ways, some of which are the following:

*Example 1.*—Equal molecular weights of urea and formaldehyde are mixed in a concentrated aqueous solution, carefully dried, and ground to a fine powder.

*Example 2.*—6 pounds of urea are stirred into 16 pounds of formaldehyde solution (40% by volume), then 4 ounces of sulphuric acid are stirred in. The batch condenses under evolution of heat to a hard mass which is ground to a powder.

*Example 3.*—6 pounds of urea are dissolved in 16 pounds of formaldehyde solution (40% by volume); 1 ounce of 75% phosphoric acid is added, the batch allowed to set to a hard mass, and ground.

*Example 4.*—1 pound of urea is dissolved in 4 pounds of formaldehyde solution (40% by volume), and 4 ounces of 40% caustic soda solution added. The batch is allowed to stand overnight, then the precipitate is filtered off from the mother liquid, carefully dried and ground to a powder.

*Example 5.*—300 grams urea are dissolved in 800 grams formaldehyde solution (40% by volume), then sufficient caustic soda is added to make slightly alkaline to phenolphthalein. The batch is then heated to boiling; 1 cc. of acetic acid is added; boiling is continued for 15 minutes; then the solution is again made alkaline by the addition of caustic soda. This product is used as a syrup.

*Example 6.*—6 pounds of urea are intimately stirred or ground with 6½ pounds of para formaldehyde powder.

It is also obviously within the scope of the invention to add an excess of either urea or formaldehyde; or, after the material has been reduced to the dry powdered state ready for use, additional urea powder or formaldehyde in the form of para formaldehyde powder may be added if conditions warrant it.

*Example 7.*—The product is prepared according to Example 3 and 8 ounces of para formaldehyde are thoroughly mixed with the finished product.

These examples bear out, among other details, my claim of high concentration of the formaldehyde in relation to the binder,—when such concentration is desirable. In my invention the amount of material necessary to bind the formaldehyde is substantially the same or less than the formaldehyde. This also facilitates handling and storage of the fungicide. But this invention also lends itself to modifications in the other direction, which may be of advantage, particularly since there are no shortcomings on account of inert bulk. The bulk in direct connection with the insecticide, if there be any in accordance with my invention,—is in the nature of a fertilizer. Such and other variations,—as they occur to the expert in the art of fungicides and soil disinfectants in the light of this disclosure and fall within the appending claims,—also range within the scope of the protection I claim for my invention.

What I claim is:

1. In a fungicide for agricultural use, formaldehyde chemically combined with urea.

2. In a fungicide for agricultural use, a reaction product of urea and a formaldehyde.

3. In a fungicide for agricultural use, a reaction product of urea and a para formaldehyde.

JOHN PAUL REMENSNYDER.